US012224101B2

(12) United States Patent
Yen et al.

(10) Patent No.: US 12,224,101 B2
(45) Date of Patent: Feb. 11, 2025

(54) INDUCTOR DEVICE

(71) Applicant: Realtek Semiconductor Corporation, Hsinchu (TW)

(72) Inventors: Hsiao-Tsung Yen, Hsinchu (TW); Ka-Un Chan, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 820 days.

(21) Appl. No.: 17/215,321

(22) Filed: Mar. 29, 2021

(65) Prior Publication Data

US 2021/0304953 A1 Sep. 30, 2021

(30) Foreign Application Priority Data

Mar. 30, 2020 (TW) ................................ 109110870

(51) Int. Cl.
*H01F 27/28* (2006.01)
*H01F 17/00* (2006.01)
*H01F 27/29* (2006.01)

(52) U.S. Cl.
CPC ..... *H01F 27/2804* (2013.01); *H01F 17/0013* (2013.01); *H01F 27/2828* (2013.01); *H01F 27/29* (2013.01); *H01F 2017/004* (2013.01); *H01F 2017/0073* (2013.01); *H01F 2027/2809* (2013.01); *H01F 2027/2819* (2013.01)

(58) Field of Classification Search
CPC ............. H01F 27/2804; H01F 17/0013; H01F 27/2828; H01F 27/29; H01F 2017/004; H01F 2017/0073; H01F 2027/2809; H01F 2027/2819; H01F 27/28; H01F 27/2871
USPC ........................................ 336/200, 232, 192
See application file for complete search history.

(56) References Cited

U.S. PATENT DOCUMENTS

2012/0244802 A1* 9/2012 Feng ...................... H04B 5/263 336/225
2015/0310980 A1* 10/2015 Yen .......................... H01F 5/00 336/200
2016/0118180 A1* 4/2016 Chen ....................... H01F 21/12 336/170
2017/0140865 A1* 5/2017 Stamper .................. H01F 21/12
2019/0035544 A1* 1/2019 Yen ....................... H01F 29/025
2019/0237238 A1 8/2019 Yen et al.

FOREIGN PATENT DOCUMENTS

TW I645429 B 12/2018
TW 201911343 A 3/2019
TW 201933386 A 8/2019
TW I699791 B 7/2020

OTHER PUBLICATIONS

U.S. Appl. No. 17/130,201, filed Dec. 22, 2020.

* cited by examiner

*Primary Examiner* — Shawki S Ismail
*Assistant Examiner* — Kazi S Hossain
(74) *Attorney, Agent, or Firm* — troutman pepper locke; Tim Tingkang Xia, Esq.

(57) ABSTRACT

An inductor device includes a first wire, a second wire, and a third wire. The first wire includes a plurality of first sub-wires. The second wire includes a plurality of second sub-wires. The sequence of the first sub-wires and the second sub-wires is that at least two first sub-wires of the first sub-wires and at least one second sub-wires of the second sub-wires are disposed to each other in an interlaced manner. The third wire is disposed adjacent to at least two first sub-wires of the first sub-wires.

17 Claims, 6 Drawing Sheets

INDUCTOR DEVICE

RELATED APPLICATIONS

This application claims priority to Taiwan Application Serial Number 109110870, filed Mar. 30, 2020, which is herein incorporated by reference.

BACKGROUND

Field of Invention

The present disclosure relates to an electronic device. More particularly, the present disclosure relates to an inductor device.

Description of Related Art

Forms of structures of transformers and inductors are usually spiral structures, symmetrical and interlaced structures, or stacked structures. If forms of structures of transformers and inductors are symmetrical and interlaced structures, the quality value (Q value) is low due to the interlaced structure. The crossing of the interlaced structure in transformers and inductors induces consumption and low inductance. In addition, if the forms of structures of transformers and inductors are stacked structures, the quality value (Q value) will be sacrificed substantially. As a result, the application ranges of the above transformers and inductors are limited.

SUMMARY

In order to resolve the above problems, one aspect of the present disclosure provides an inductor device. The inductor device includes a first wire, a second wire, and a third wire. The first wire includes a plurality of first sub-wires. The second wire includes a plurality of second sub-wires. The sequence of the first sub-wires and the second sub-wires is that at least two first sub-wires of the first sub-wires and at least one second sub-wires of the second sub-wires are disposed to each other in an interlaced manner. The third wire is disposed adjacent to at least two first sub-wires of the first sub-wires.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

According to the usual mode of operation, various features and elements in the figures have not been drawn to scale, which are drawn to the best way to present specific features and elements related to the disclosure. In addition, among the different figures, the same or similar element symbols refer to similar elements/components.

DESCRIPTION OF THE EMBODIMENTS

Figure 1:
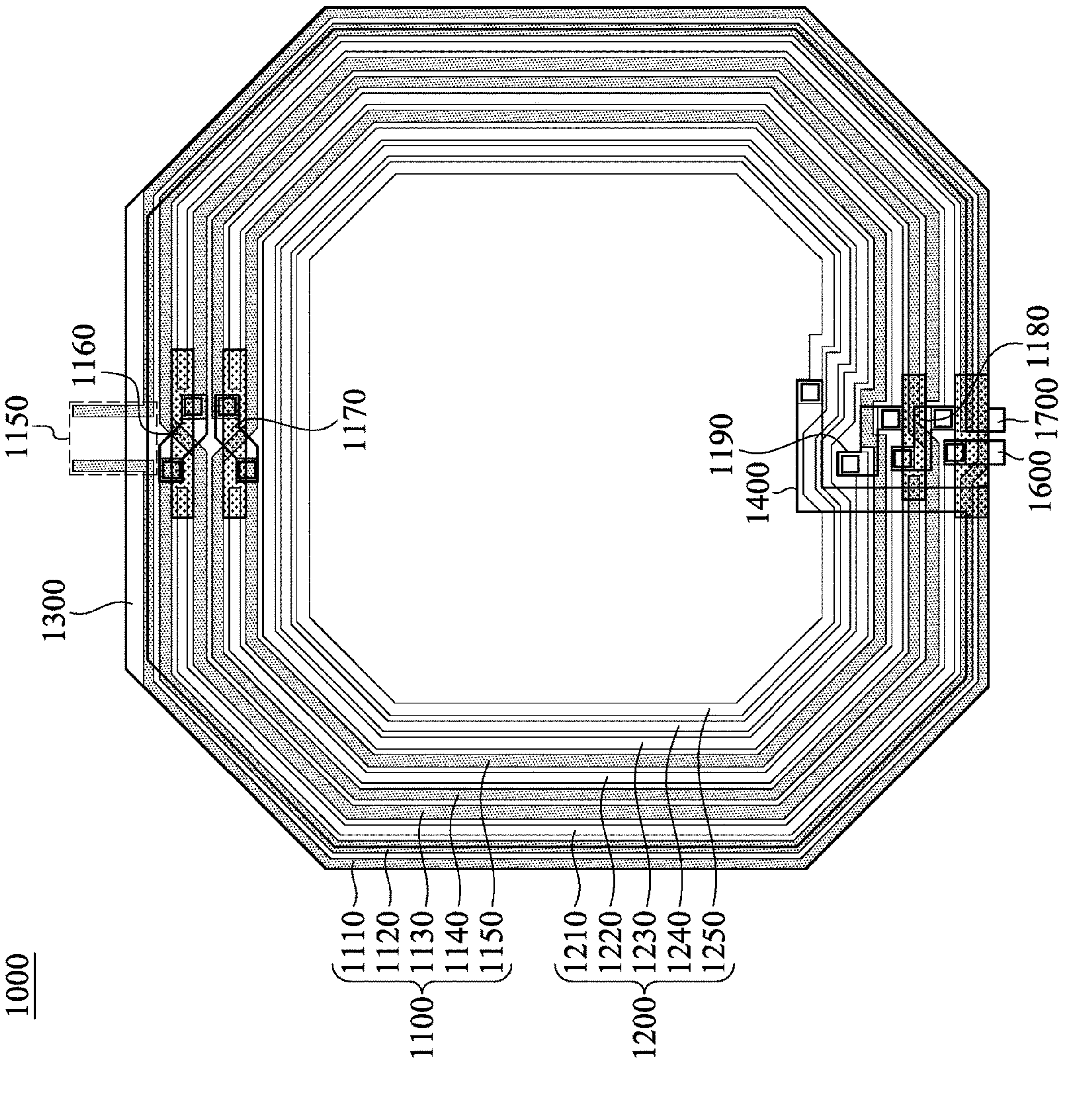
FIG. 1 depicts a schematic diagram of an inductor device according to one embodiment of the present disclosure.

FIG. 1 depicts a schematic diagram of an inductor device according to one embodiment of the present disclosure. As shown in the figure, the inductor device 1000 includes a first wire 1100, a second wire 1200, and a third wire 1300. The first wire 1100 includes a plurality of first sub-wires 1110, 1120, 1130, 1140, 1150. The second wire 1200 includes a plurality of second sub-wires 1210, 1220, 1230, 1240, 1250.

Figure 2:
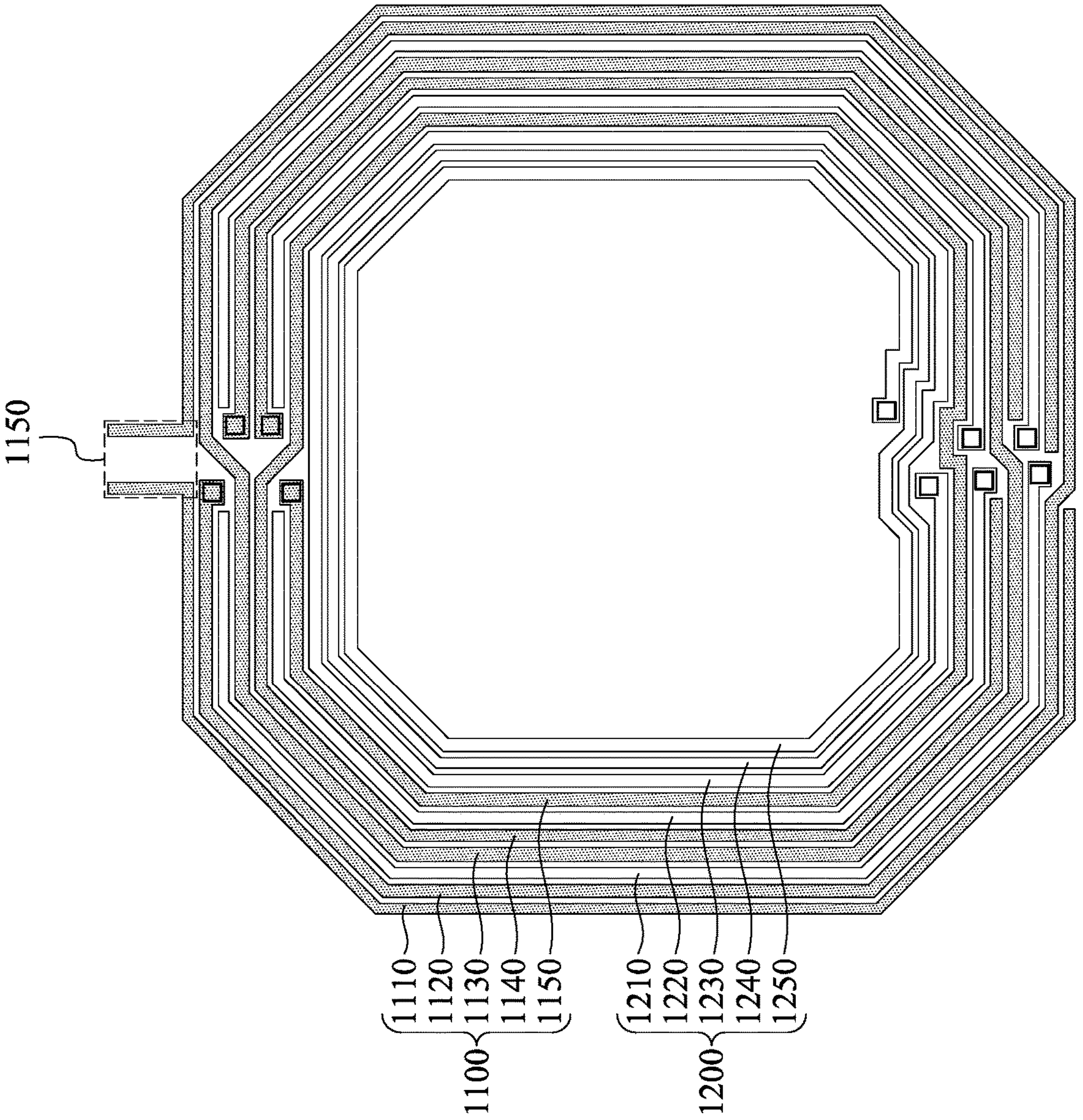
FIG. 2 depicts a schematic diagram of partial structure of the inductor device shown in FIG. 1 according to another embodiment of the present disclosure.
Figure 3:
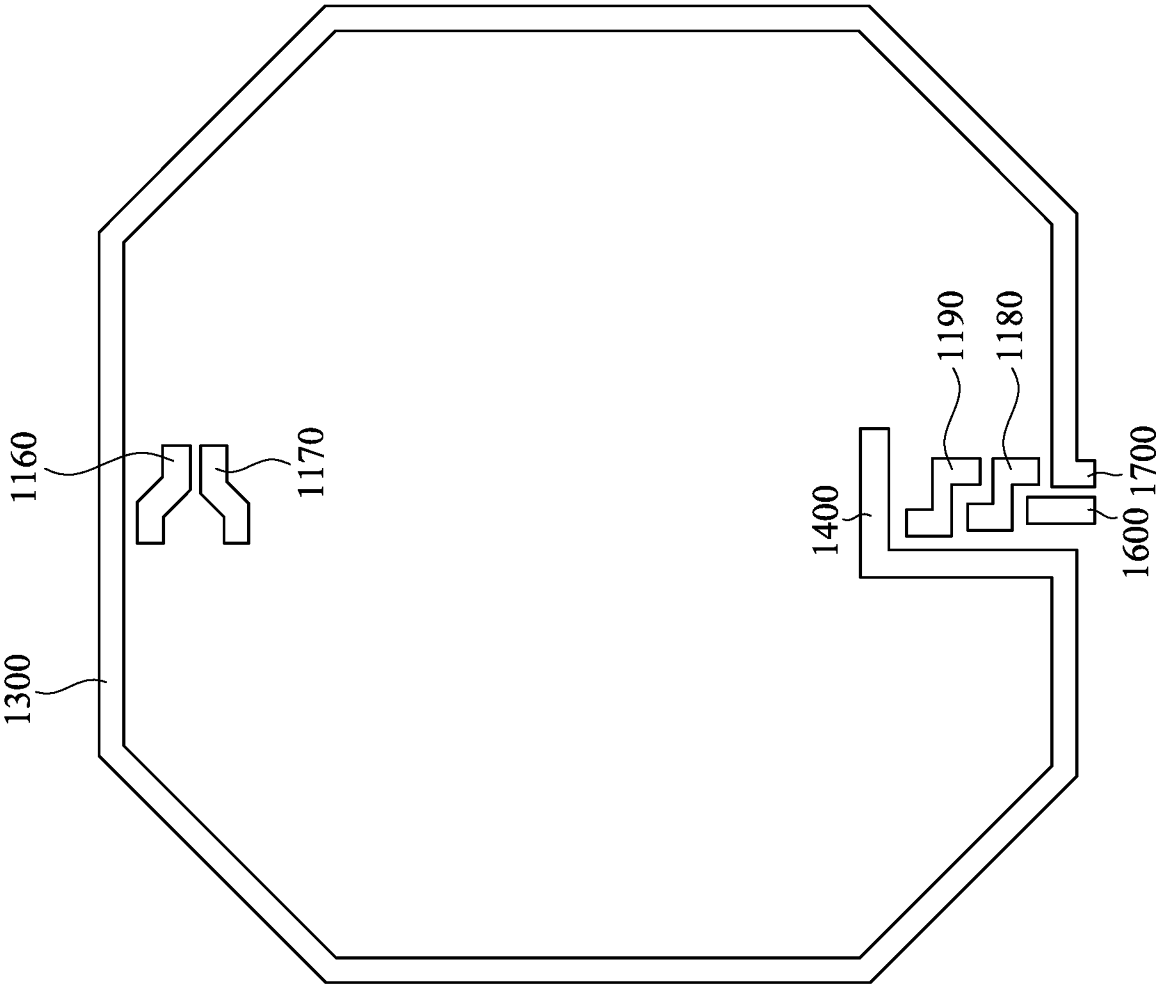
FIG. 3 depicts a schematic diagram of partial structure of the inductor device shown in FIG. 1 according to another embodiment of the present disclosure.

For facilitating the understanding of the structure of the inductor device 1000, reference is now made to FIGS. 1-3. FIGS. 2-3 depict schematic diagram of partial structure of the inductor device shown in FIG. 1 according to another embodiment of the present disclosure. As shown in the figure, the sequence of the first sub-wires 1110~1150 and the second sub-wires 1210~1250 is that "at least two first sub-wires of the first sub-wires 1110~1150 and at least one of second sub-wires of the second sub-wires 1210~1250 are disposed in an interlaced manner." For example, the sequence of the first sub-wires 1110~1150 and the second sub-wires 1210~1250 is "the first sub-wires 1110, 1120, the second sub-wire 1210, the first sub-wires 1130, 1140, and the second sub-wire 1220."

The third wire 1300 is disposed adjacent to at least two first sub-wires of the first sub-wires 1110~1150. For example, the third wire 1300 is disposed adjacent to at least two first sub-wires 1110, 1120 of the first sub-wires 1110~1150. However, the present disclosure is not intended to be limited to the above-mentioned embodiments. In some embodiments, the third wire 1300 can be disposed adjacent to at least two first sub-wires 1130, 1140 depending on actual requirements.

In one embodiment, the first wire 1100 and the second wire 1200 are disposed on the first layer, and the third wire 1300 is disposed on the second layer. In another embodiment, the first layer is different from the second layer. For example, the first wire 1100 and the second wire 1200 can be disposed on a lower layer of the inductor device 1000, and the third wire 1300 can be disposed on an upper layer of the inductor device 1000.

In one embodiment, the third wire 1300 partially overlaps at least one first sub-wire of the first sub-wires 1110~1150. For example, in a direction which is perpendicular to the first wire 1100, the third wire 1300 partially overlaps at least one first sub-wire 1110 of the first sub-wires 1110~1150. However, the present disclosure is not intended to be limited to the above-mentioned embodiments. In some embodiments, the third wire 1300 can partially overlap the first sub-wire 1130 depending on actual requirements.

In one embodiment, the third wire 1300 can totally overlap at least one first sub-wire of the first sub-wires 1110~1150. For example, in a direction which is perpendicular to the first wire 1100, the third wire 1300 can totally overlap at least one first sub-wire 1110 of the first sub-wires 1110~1150. In another embodiment, as shown in FIG. 1, the third wire 1300 is disposed at an outside of the inductor device 1000. However, the present disclosure is not intended to be limited to the above-mentioned embodiments. In some embodiments, the third wire 1300 can totally overlap the first sub-wire 1130 depending on actual requirements.

In one embodiment, the third wire 1300 is disposed between at least two first sub-wires of the first sub-wires 1110~1150. For example, in a direction which is perpendicular to the first wire 1100, the third wire 1300 can be disposed between at least two first sub-wires 1110, 1120 of the first sub-wires 1110~1150. However, the present disclosure is not intended to be limited to the above-mentioned embodiments. In some embodiments, the third wire 1300 can be disposed between at least two first sub-wires 1130, 1140 of the first sub-wires 1110~1150 depending on actual requirements.

In one embodiment, the inductor device 1000 further includes a connection element 1400. The connection element 1400 is coupled to the third wire 1300 and a second sub-wire which is at an inner side of the second sub-wires 1210~1250. For example, the connection element 1400 is coupled to the third wire 1300, and coupled to the second sub-wire 1250 which is at an inner side of the second sub-wires 1210~1250.

In one embodiment, the first wires 1110~1150 and the second wires 1210~1250 are disposed on a first layer, and the third wire 1300 and the connection element 1400 are disposed on a second layer. In one embodiment, the connection element 1400 crosses the first sub-wires 1110~1150 and the second sub-wires 1210~1250 at the same time. For example, the first wires 1110~1150 and the second wires 1210~1250 are disposed on a lower layer, and the third wire 1300 and the connection element 1400 are disposed on an upper layer. As shown in the figure, the connection element 1400 which is disposed on the upper layer crosses the first sub-wires 1110~1150 and the second sub-wires 1210~1250 which are disposed on the lower layer at the same time.

Referring to FIG. 1, the second sub-wires 1210~1250 are winded to form a plurality of wires at an innermost side of the inductor device 1000. For example, at the outside part of the inductor device 1000, a sequence of the first sub-wires 1110~1150 and the second sub-wires 1210~1250 is "the first sub-wire 1110, the first sub-wire 1120, the second sub-wire 1210, etc." At the innermost side of the inductor device 1000, the second sub-wires 1230, 1240, and 1250 are winded to form a plurality of wires.

In one embodiment, the inductor device 1000 further includes a first input/output terminal 1500. The first input/output terminal 1500 is disposed at a first side of the inductor device 1000, and located at the first sub-wire which is at an outer side of the first sub-wires 1110~1150. For example, the first input/output terminal 1500 is disposed at an upper side of the inductor device 1000, and located at the first sub-wire 1110 which is at an outer side of the first sub-wires 1110~1150. In another embodiment, the first input/output terminal 1500 and the third wire 1300 are overlapped to each other. For example, in a direction which is perpendicular to the first wire 1100, the first input/output terminal 1500 and the third wire 1300 are overlapped to each other.

In one embodiment, the inductor device 1000 further includes a second input/output terminal 1600. The second input/output terminal 1600 is disposed at a second side of the inductor device 1000, and located at the second sub-wire which is at an outer side of the second sub-wires 1210~1250. For example, the second input/output terminal 1600 is disposed at a lower side of the inductor device 1000, and located at the second sub-wire 1210 which is at an outer side of the second sub-wires 1210~1250.

In one embodiment, the inductor device 1000 further includes a third input/output terminal 1700. The third input/output terminal 1700 is disposed at a second side of the inductor device 1000, and located at the third wire 1300. For example, the third input/output terminal 1700 is disposed at a lower side of the inductor device 1000, and located at the third wire 1300.

In one embodiment, the first sub-wires 1110~1150 are coupled to each other at the first side of the inductor device 1000 in an interlaced manner. For example, the first sub-wires 1110~1150 are coupled to each other at an upper side of the inductor device 1000 in an interlaced manner. Specifically, the first sub-wire 1120 is coupled to the first sub-wire 1130 through the connection element 1160 at the upper side. In addition, the first sub-wire 1140 is coupled to the first sub-wire 1150 through the connection element 1170 at the upper side.

In one embodiment, the second sub-wires 1210~1250 are coupled to each other at a second side of the inductor device 1000 in an interlaced manner. For example, the second sub-wires 1210~1250 are coupled to each other at a lower side of the inductor device 1000 in an interlaced manner. Specifically, the second sub-wire 1210 is coupled to the second sub-wire 1220 through the connection element 1180 at the lower side. In addition, the second sub-wire 1220 is coupled to the second sub-wire 1230 through the connection element 1190 at the lower side. Besides, the second sub-wire 1220 crosses the first sub-wire 1150 through the connection element 1190 at the lower side of the inductor device 1000, and is coupled to the second sub-wire 1230 in an interlaced manner.

In one embodiment, part of the structure of the inductor device 1000 is a symmetrical and interlaced structure. Another part of the structure of the inductor device 1000 is disposed in a spiral structure, and is stacked above the symmetrical and interlaced structure or stacked below the symmetrical and interlaced structure. For example, the first wire 1100 and the second wire 1200 of the inductor device 1000 is a symmetrical and interlaced structure (they can be coupled to each other in an interlaced manner through the connection elements 1160, 1170, 1180, 1190), and the third wire 1300 is a spiral structure and is stacked above the first wire 1100 and the second wire 1200 or stacked below the first wire 1100 and the second wire 1200.

Figure 4:
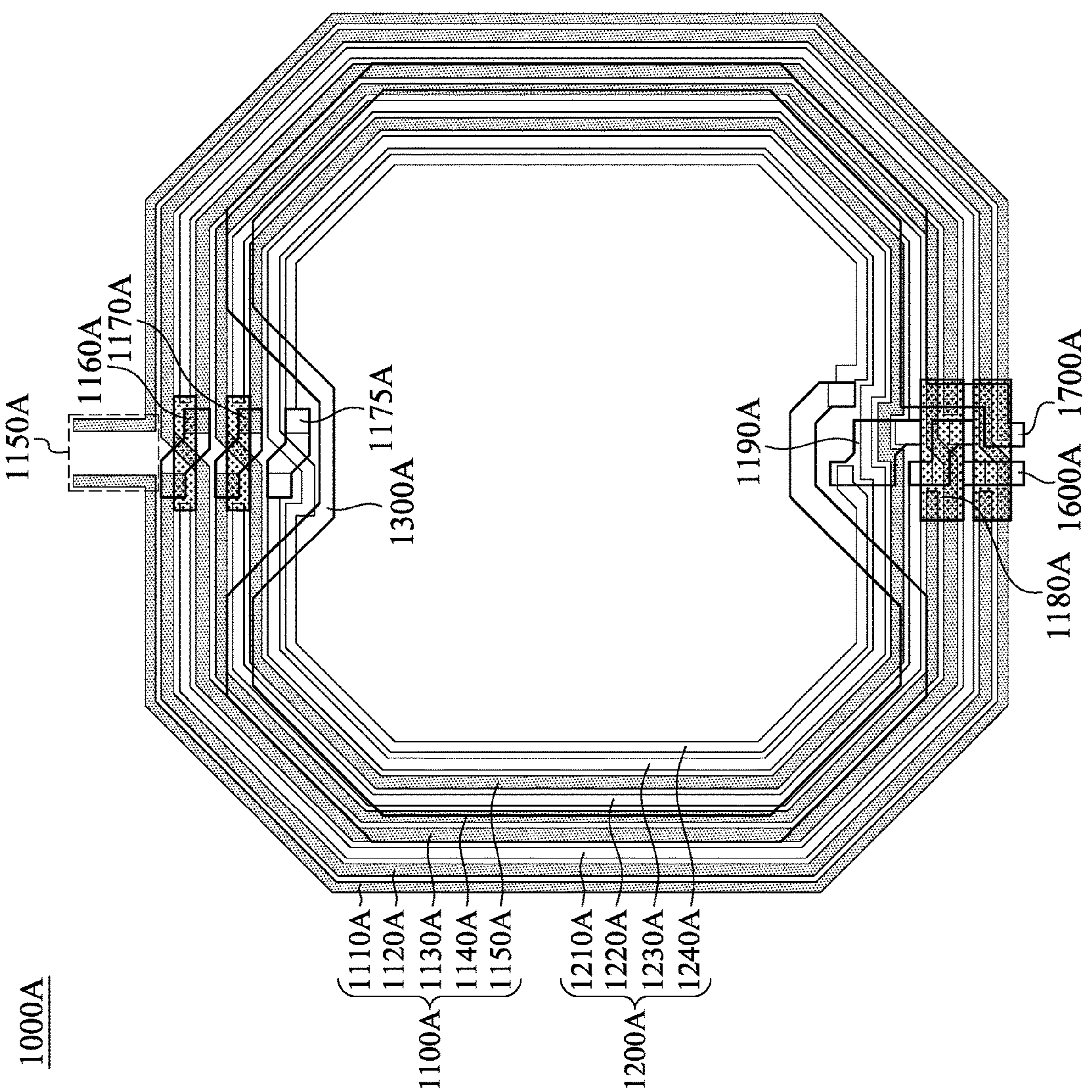
FIG. 4 depicts a schematic diagram of an inductor device according to one embodiment of the present disclosure.

FIG. 4 depicts a schematic diagram of an inductor device according to one embodiment of the present disclosure. Compared with the inductor device 1000 in FIG. 1, the disposition of the third sub-wire 1300A of the inductor device 1000A is different. For example, the third sub-wire 1300A is winded toward the innermost side of the inductor device 1000A at the upper and the lower side of the inductor device 1000A, and the third sub-wire 1300A can be disposed above the first sub-wire 1130A at the left and the right side of the inductor device 1000A. Besides, the inductor device 1000A further includes a connection element 1175A. The connection element 1175A couples the second sub-wire 1230A and the second sub-wire 1240A at the upper side.

Figure 5:
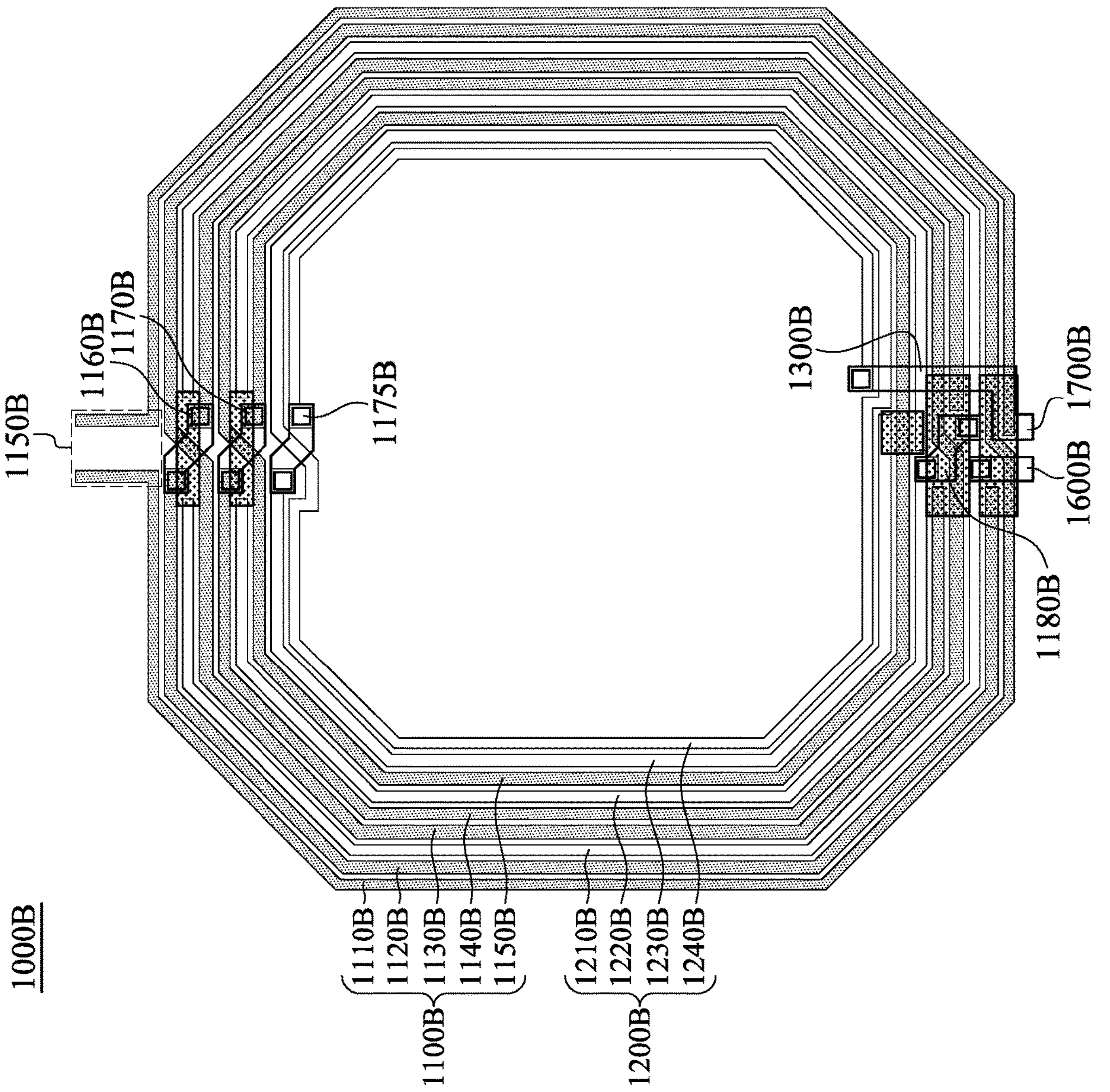
FIG. 5 depicts a schematic diagram of an inductor device according to one embodiment of the present disclosure.

FIG. 5 depicts a schematic diagram of an inductor device according to one embodiment of the present disclosure. Compared with the inductor device 1000 in FIG. 1, the disposition of the third sub-wire 1300B of the inductor device 10008 is different. For example, one terminal of the third sub-wire 1300B is coupled to the second sub-wire 1240B which is located at the innermost side of the inductor device 1000B directly, and another terminal of the third sub-wire 1300B can be used as an input/output terminal 1700B. In addition, the inductor device 10008 further includes a connection element 1175B. The connection element 11758 couples the second sub-wire 12308 and the second sub-wire 1240B at the upper side.

Figure 6:
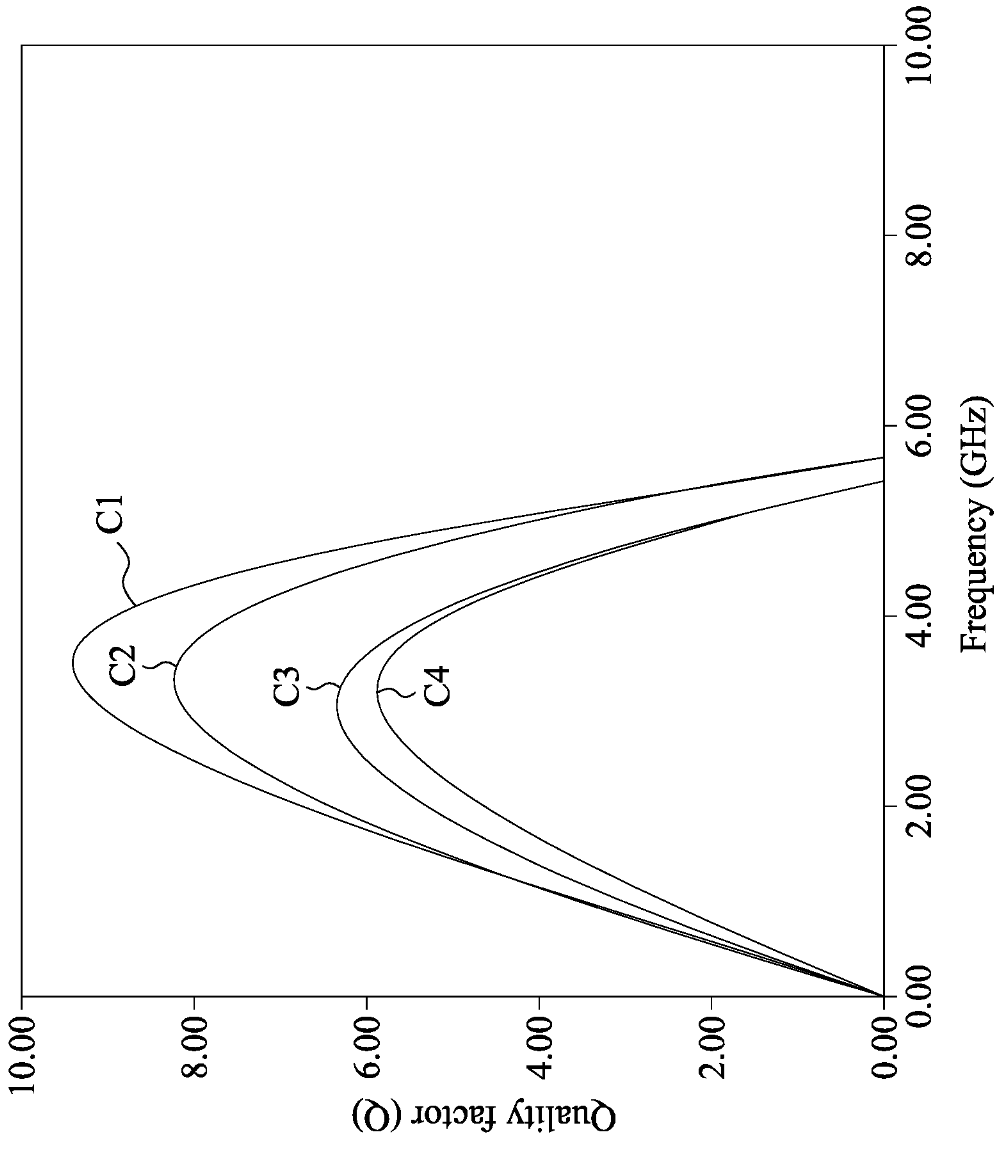
FIG. 6 depicts a schematic diagram of experimental data of an inductor device according to one embodiment of the present disclosure.

FIG. 6 depicts a schematic diagram of experimental data of the inductor device according to one embodiment of the present disclosure. The diagram of experimental data illustrates quality factors (Q) of the inductor device in different frequency. As shown in the figure, the experimental curves of quality factors (Q) of the first wire 1100 and the second wire 1200 of the inductor device 1000 of the present disclosure are C1, C2. In addition to that, the experimental curves of quality factors of two wires of traditional inductor device are C3, C4. It can be seen from the experimental data in FIG. 6 that the quality factors of the first wire 1100 and the second wire 1200 of the inductor device 1000 are 7.7 and 7.3 respectively. Compare to that, the quality factors of two wires of traditional inductor device are 5.9 and 5.3 respectively. Therefore, the design of the structure of the inductor device in the present disclosure can enhance the efficiency of the inductor device. However, the present disclosure is not limited to the values disclosed in the above-mentioned embodiment, and a person of ordinary skilled in the art may use a suitable value depending on actual requirements for achieving a better efficiency.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A inductor device, comprising:

a first wire, comprising:

a plurality of first sub-wires;

a second wire, comprising:

a plurality of second sub-wires, wherein an arranged sequence of the first sub-wires and the second sub-wires comprises one of at least two first sub-wire of the first sub-wires, another one of at least two first sub-wire of the first sub-wires, and at least one of second sub-wire of the second sub-wires; and a third wire, disposed adjacent to the at least two first sub-wire of the first sub-wires, wherein the third wire partially overlaps at least two of the first sub-wires.

2. The inductor device of claim 1, wherein the first wire and the second wire are disposed on a first layer, and the third wire is disposed on a second layer.

3. The inductor device of claim 2, wherein the first layer is different from the second layer.

4. The inductor device of claim 3, wherein the third wire totally overlaps at least one of first sub-wire of the first sub-wires.

5. The inductor device of claim 1, wherein the third wire is disposed at an outside of the inductor device.

6. The inductor device of claim 1, wherein the third wire is disposed between the at least two first sub-wires of the first sub-wires.

7. The inductor device of claim 1, further comprising:

a connection element, coupled to the third wire and the second sub-wire which is at an inner side of the second sub-wires.

8. The inductor device of claim 7, wherein the first wire and the second wire are disposed on a first layer, and the third wire and the connection element are disposed on a second layer.

9. The inductor device of claim 8, wherein the connection element crosses the first sub-wires and the second sub-wires.

10. The inductor device of claim 1, wherein the second sub-wires are winded to form a plurality of wires at an innermost side of the inductor device.

11. The inductor device of claim 1, further comprising:

a first input/output terminal, disposed at a first side of the inductor device, and located at the first sub-wire which is at an outer side of the first sub-wires.

12. The inductor device of claim 11, wherein the first input/output terminal and the third wire are overlapped to each other.

13. The inductor device of claim 12, further comprising:

a second input/output terminal, disposed at a second side of the inductor device, and located at the second sub-wire which is at an outer side of the second sub-wires.

14. The inductor device of claim 13, further comprising:

a third input/output terminal, disposed at the second side of the inductor device, and located at the third wire.

15. The inductor device of claim 14, wherein the first sub-wires are coupled to each other at the first side of the inductor device in an interlaced manner.

16. The inductor device of claim 15, wherein the second sub-wires are coupled to each other at the second side of the inductor device in an interlaced manner.

17. The inductor device of claim 16, wherein the second sub-wires cross and is coupled to the first sub-wires the second side of the inductor device in an interlaced manner.

* * * * *